US011861165B2

United States Patent
Mak et al.

(10) Patent No.: US 11,861,165 B2
(45) Date of Patent: *Jan. 2, 2024

(54) OBJECT TIERING IN A DISTRIBUTED STORAGE SYSTEM

(71) Applicant: NetApp, Inc., San Jose, CA (US)

(72) Inventors: Raymond Yu Shun Mak, Vancouver (CA); Aditya Kalyanakrishnan, Sunnyvale, CA (US); Song Guen Yoon, Vancouver (CA); Emalayan Vairavanathan, Vancouver (CA); Dheeraj Sangamkar, Vancouver (CA); Chia-Chen Chu, Vancouver (CA)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,603

(22) Filed: Dec. 30, 2021

(65) Prior Publication Data

US 2022/0121364 A1    Apr. 21, 2022

Related U.S. Application Data

(63) Continuation of application No. 16/359,658, filed on Mar. 20, 2019, now Pat. No. 11,243,692.

(60) Provisional application No. 62/777,012, filed on Dec. 7, 2018.

(51) Int. Cl.
*G06F 3/06* (2006.01)
*G06F 16/16* (2019.01)

(52) U.S. Cl.
CPC ............ *G06F 3/0604* (2013.01); *G06F 3/067* (2013.01); *G06F 3/0644* (2013.01); *G06F 3/0647* (2013.01); *G06F 16/164* (2019.01)

(58) Field of Classification Search
CPC .... G06F 3/0604; G06F 16/164; G06F 3/0644; G06F 3/0647; G06F 3/067; G06F 12/00; G06F 13/00
See application file for complete search history.

(56) References Cited

U.S. PATENT DOCUMENTS

| | | | |
|---|---|---|---|
| 11,243,692 B2 | 2/2022 | Mak et al. | |
| 2005/0223156 A1 | 10/2005 | Lubbers et al. | |
| 2007/0156954 A1* | 7/2007 | Trika | G06F 11/1471 711/E12.04 |
| 2009/0037682 A1 | 2/2009 | Armstrong et al. | |
| 2009/0067243 A1* | 3/2009 | Takase | G11C 16/26 365/185.11 |

(Continued)

*Primary Examiner* — Tuan V Thai
(74) *Attorney, Agent, or Firm* — HAYNES AND BOONE, LLP (57) ABSTRACT

A system, method, and machine-readable storage medium for analyzing a state of a data object are provided. In some embodiments, the method includes receiving, at a storage device, a metadata request for the data object from a client. The data object is composed of a plurality of segments. The method also includes selecting a subset of the plurality of segments and obtaining a segment state for each segment of the subset. Each segment state indicates whether the respective segment is accessible via a backing store. The method further includes determining a most restrictive state of the one or more segment states and sending state information to the client in response to the metadata request, the state information being derived from the most restrictive state.

20 Claims, 6 Drawing Sheets

(56) References Cited

U.S. PATENT DOCUMENTS

| | | |
|---|---|---|
| 2014/0173236 A1 | 6/2014 | Kegel |
| 2016/0173605 A1* | 6/2016 | Iasi ......................... H04L 67/06 |
| | | 709/219 |
| 2018/0173598 A1 | 6/2018 | Zeng et al. |

* cited by examiner

OBJECT TIERING IN A DISTRIBUTED STORAGE SYSTEM

PRIORITY INFORMATION

This application is a continuation of U.S. patent application Ser. No. 16/359,658, filed Mar. 20, 2019, which claims priority from U.S. Provisional Application No. 62/777,012, filed Dec. 7, 2018, the disclosures of which are hereby incorporated by reference in their entireties.

TECHNICAL FIELD

The present description relates to the tiering of objects, and more specifically, to a system, method, and machine-readable storage medium for improved tiering objects in a distributed storage system for cost savings, disaster recovery, and/or cost management.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers to provide data and manage its flow. Improvements in distributed storage have given rise to a cycle where applications demand increasing amounts of data delivered with reduced latency, greater reliability, and greater throughput. Hand-in-hand with this trend, system administrators have taken advantage of falling storage prices to add capacity wherever possible.

One approach involves tiering to cloud storage arrays of varying accessibility speeds. Slower speeds provide reduced cost, but at higher latency (i.e., delay to client requests). While tiering can provide cost benefits, current approaches have limitations in their ability for a given node to tier to only one cloud storage provider, and/or in their ability for disaster recovery should the particular node tiered to a cloud storage provider fail.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

A client may store data objects at a storage node, which may then backup some of its data objects at a backing store. If the size of the data object is greater than a threshold, the storage node may partition the data object into a plurality of segments and store the individual segments. Content stored at the storage node may be backed up to the backing store. The term "content" may be used to refer to as a "data object" or a "segment of a data object." The backing store may store individual segments of a data object and transition segments stored at the backing store into different states or storage classes.

In some examples, the client sends a metadata request to the storage node for the state of the data object. The metadata request may be a request for metadata of the data object without a request for the return of the actual data object itself. The client may be unaware that the storage node backs up content to a cloud endpoint (e.g., backing store). The storage node may send a request to the appropriate backing store for the segment state of each segment of which the data object is composed. The storage node may determine the state of the data object based on the returned segment states. Rather than request the segment state for each segment of the data object, the storage node may sample segments of the data object. For example, the storage node may select a subset of the plurality of segments and request the segment states for the subset. A segment stored in a backing store may be in one of a plurality of segment states, each segment state indicating whether the respective segment is accessible via a backing store.

Different segment states may be associated with different costs. In an example, the more restrictive a segment state of a segment is, the cheaper it may be to store the segment. As an example, a first state may be more restrictive than a second state if more processing cycles are used for returning a segment that is in the first state compared to the second state. For example, a segment that is inaccessible and no restore operation for the segment has been triggered may be in a more restrictive state than a segment that is accessible. If a segment is inaccessible via the backing store, the entire data object may be inaccessible. The storage node determines a most restrictive state of the selected subset and transmits state information derived from the restrictive state to the client in response to the client's metadata request. The state information may indicate the state of the entire data object to the client.

By sampling a subset of the plurality of segments for their segment states rather than all segments of the data object, latency may be reduced while determining the state of the data object with a reasonable degree of accuracy. The segment states of the subset may be a close approximation of the state of the entire data object because segments of the data object are typically migrated together and restored together. Accordingly, the segment states corresponding to the same data object have a high probability of being the same. Additionally, costs may be reduced by leveraging the sampling techniques discussed in the present disclosure due to fewer requests being made to cloud-service providers. The more requests issued to a cloud-service provider regarding a data object, the more expensive it may be to find information on or retrieve the data object.

Figure 1:
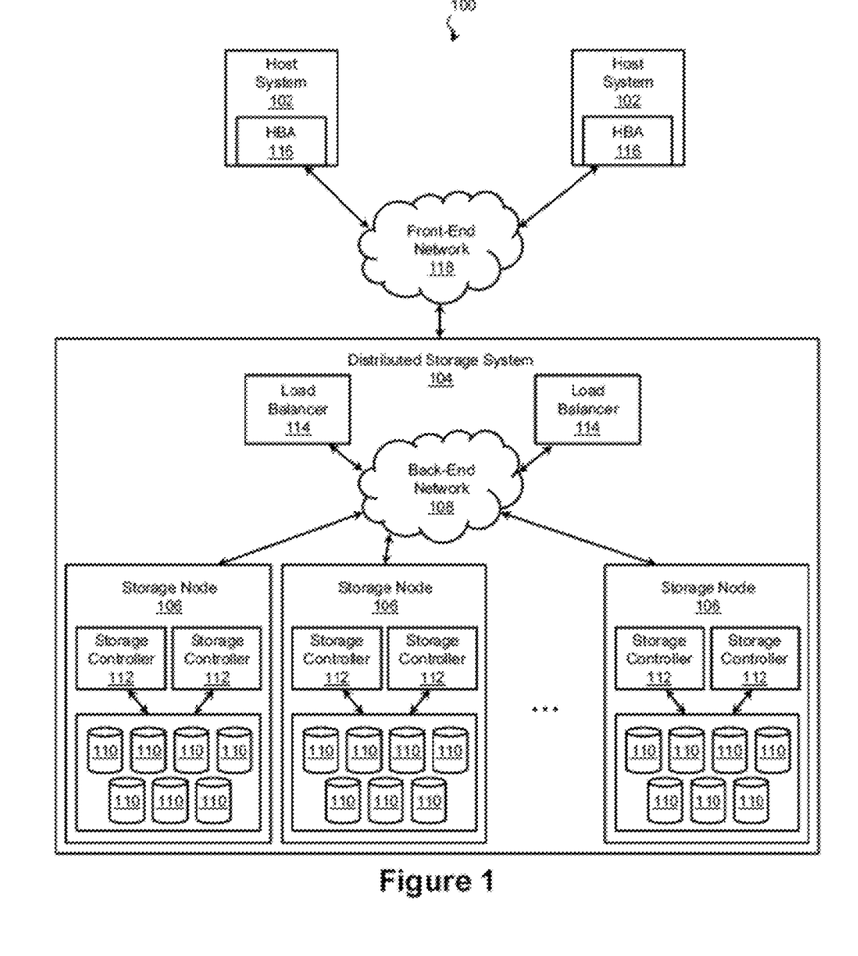
FIG. 1 is a schematic diagram of a computing architecture according to aspects of the present disclosure.

FIG. 1 is a schematic diagram of a computing architecture 100 according to aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID system, an OpenStack Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some exemplary embodiments, the storage nodes 106 are coupled by a TCP/IP back-end network 108, which is local to a rack or datacenter, although additionally or in the alternative, the network 108 may extend between sites in a WAN configuration or be a virtual network extending throughout a cloud. As can be seen, the storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and other considerations. A technique for preserving and restoring the data contained in these storage nodes 106, suitable for use with any of these arrangements, is described with reference to the figures that follow.

In the illustrated embodiment, the computing architecture 100 includes a plurality of storage nodes 106 in communication with a plurality of hosts 102. It is understood that for clarity and ease of explanation, only limited number of storage nodes 106 and hosts 102 are illustrated, although the computing architecture 100 may include any number of hosts 102 in communication with a distributed storage system 104 containing any number of storage nodes 106. An exemplary storage system 104 receives data transactions (e.g., requests to read and/or write data) from the hosts 102 and takes an action such as reading, writing, or otherwise accessing the requested data so that storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure, and likewise appear to be directly connected (local) to the hosts 102.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. At a high level, virtualization includes mapping physical addresses of the storage devices into a virtual address space and presenting the virtual address space to the hosts 102, other storage nodes 106, and other requestors. In this way, the storage node 106 represents the group of devices as a single device, often referred to as a volume. Thus, a requestor can access data within a volume without concern for how it is distributed among the underlying storage devices 110.

Further, an exemplary storage node 106 may be connected to one or more cloud storage providers of varying levels (e.g., standard cloud storage or lower-class cloud storage, or both, for example S3 or GLACIER storage classes). The cloud storage node 106 may exercise protocol-level control over the allocated cloud storage space available to it on behalf of the hosts 102. Such control may be via one or more protocols such as HTTP, HTTPS, etc.

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally, or in the alternative, a host 102 may initiate a data transaction by contacting one or more of the storage nodes 106 directly rather than contacting the load balancer 114.

Turning now to the hosts 102, a host 102 includes any computing resource that is operable to exchange data with the distributed storage system 104 by providing (initiating) data transactions to the distributed storage system 104. In an exemplary embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to the load balancer 114 or to a storage node 106 directly via the front-end network 118.

Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

As described above, the storage system 104 may distribute the hosts' data across the storage nodes 106 for performance reasons as well as redundancy. The distributed storage system 104 is an object-based data system. The storage system 104 may be a distributed object store that spans multiple storage nodes 106 and sites. In brief, object-based data systems provide a level of abstraction that allows data of any arbitrary size to be specified by an object identifier. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3. A data object represents any arbitrary unit of data regardless of whether it is organized as an object, a file, or a set of blocks.

Figure 2:
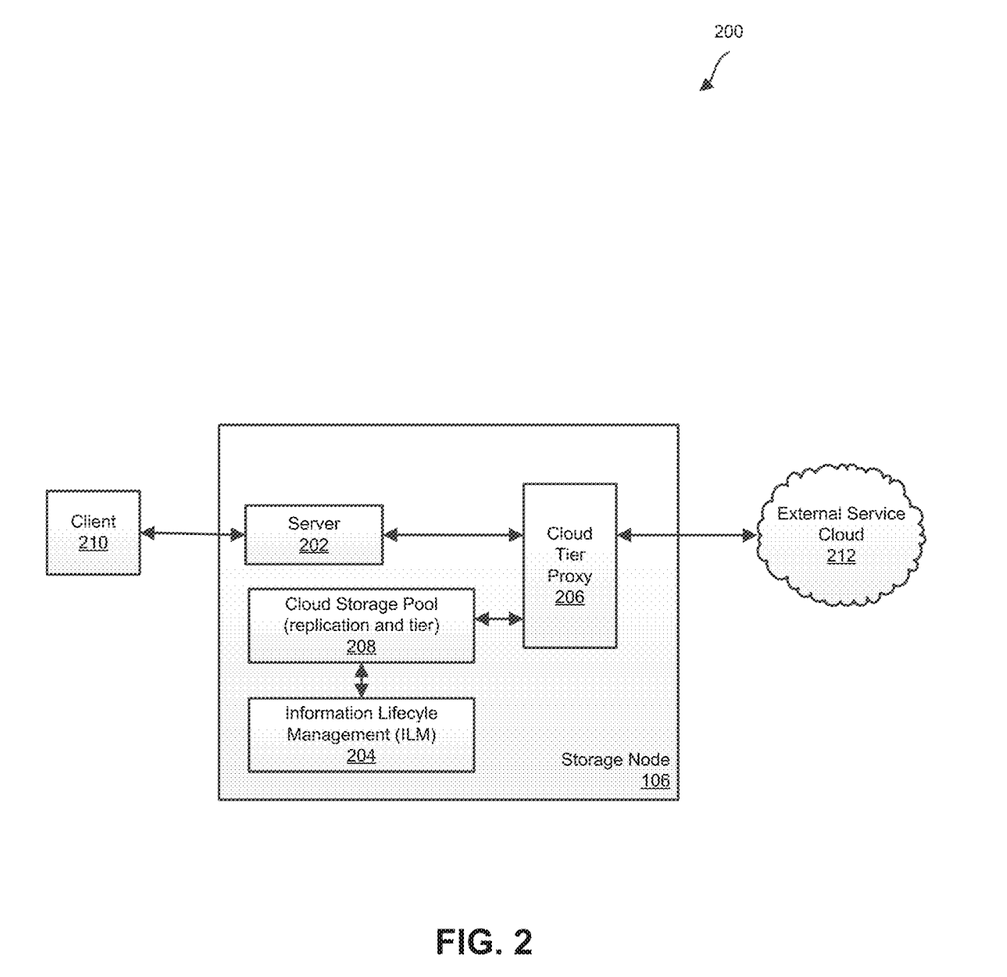
FIG. 2 is a schematic diagram of a storage node according to aspects of the present disclosure.

FIG. 2 is a schematic diagram of a storage node 106 according to aspects of the present disclosure. The storage node 106 corresponds to storage node 106 in FIG. 1. The storage node 106 may coordinate and manage resources from multiple clouds (e.g., a public and a private cloud) within a single grid or other storage grids and provide access to tiered objects to one or more clients 212. Many storage nodes 106 may be present in the grid and store data backups in the grid. Accordingly, if parts of the grid become unavailable (e.g., a storage node goes down), the client 210 may still be able to access objects tiered to the cloud by leveraging resources on the multiple storage nodes 106 that are still available. For example, each storage node 106 may receive metadata for the objects tiered to one or more clouds. Thus, while a given storage node 106 may have initially tiered particular data to a cloud storage provider, the corresponding metadata becomes available in the other storage nodes 106 in the grid and therefore those other storage nodes 106 now have the appropriate information to access that tiered data independent of the originating storage node 106.

The storage node 106 includes a server 202, an information lifecycle management (ILM) 204, a cloud tier proxy 206, and a storage pool 208. The storage pool 208 may be stored in the storage devices 110. Additionally, the storage controller 112 may include the server 202, the cloud tier proxy 206, and the ILM 104. The ILM 204 may include a policy including a set of prioritized ILM rules that specify the instructions for managing object data over time. The storage pool 208 uses the cloud tier proxy 206 to communicate with an external service cloud 212. The external service cloud 212 may be, for example, AWS S3 or Glacier, or an Azure cloud, etc. (just to name a few non-limiting examples). The cloud tier proxy 206 provides a tiering service that runs on one or more storage nodes 106.

Object State

When an object is stored in the cloud, for example tiered to the cloud according to embodiments of the present disclosure, the object may be segmented into content blocks that have their own individual metadata, as well as metadata that identifies the segments as being part of the composite segmented object, referred to herein as a container segment.

The cloud tier proxy 206 determines a state of objects composed of multiple segments in the cloud based on sampling a subset of the segments. The server 202 has the intelligence to combine the result of sampling and form an approximation of the state of the object. Additionally, the server 202 may use the cloud tier proxy 206 to communicate with the external service cloud 212. In an example, objects in the distributed storage system 104 may be composed of multiple segments up to a maximum number of segments (e.g., 10,000 maximum segments). An object may be stored in the grid and archived into a first archive store. Under the ILM control, if the object has not been accessed after a threshold amount of time, the object may be moved from the first archive store and archived into a second archive store (e.g., tiered to the cloud). The object may stay stored in the second archive store for a long time.

The cloud tier proxy 206 may determine the state of an object that has been tiered to the cloud. In current approaches, to determine the state of the object every segment would be checked. This is burdensome. In some examples of the present disclosure, the cloud tier proxy 206 may approximate a state of the object by sampling a state of a subset of multiple segments of the object. The cloud tier proxy 206 may inspect and determine, based on the sampling, the state of the object. The cloud tier proxy 206 may sample the object in accordance with a sampling percentage. In an example, if the object is composed of 10,000 segments and the sampling percentage is 10%, the cloud tier proxy 206 samples 1,000 segments of the object in a particular order. The sampling may include sampling the container segment as part of the sampling. For example, the cloud tier proxy 206 may sample the container segment first. If the container segment is available, the cloud tier proxy 206 may determine that the object in total is restored/available to a host. This is because the container segment is typically restored last out of all the segments of a given object. Accordingly, the cloud tier proxy 206 may determine, based on the sampling, a state of the segmented object as-a-whole, on the endpoint.

In another example, the cloud tier proxy 206 may determine, based on performing a POST restore operation, a state of the segmented object as-a-whole, on the endpoint. The POST restore operation may be a HTTP POST request to perform a restore operation. The order of restoring segments of an object for a POST restore operation may be used with the approximation scheme. If an object is tiered to the first archive store and then transitioned to the second archive store, the object may not be directly accessible from the grid. For example, if the client 210 attempts to retrieve the object, the client 210 may receive an error specifying that the object is in an invalid state and may further receive a request to perform a POST restore operation to retrieve the object. The POST restore operation for multiple-segment objects may involve performing a restore for each object segment that has been tiered to the second archive store in order to move the object segment from the second archive store to the first archive store. Additionally, the client 210 may be expected to periodically check for the completion of the restore operation. Depending on the resource tier being used, the completion time may vary greatly (e.g., from a couple of minutes to 12 hours or more). A HEAD operation may be used to retrieve metadata from the object without returning the object itself. The client 210 may execute the HEAD operation to check the object's resource state to determine whether the object restore has completed and whether the object is in a retrievable state.

In some examples, the cloud tier proxy 206 executes the POST restore work flow for tiered objects. The cloud tier proxy 206 supports the semantics of a POST restore operation and retrieval of content after the POST restore operation. The POST restore operation may trigger a restore for all individual segments of an object tiered to the second archive store but does so in such a way that the HEAD operation may use some information about the order of the POST restore operation to ensure the samplings of the recorded object states have a higher chance of being correct than incorrect. Additionally, the container segment may be restored last. Accordingly, if an error occurs before the restore operation completes, the container segment will not be restored and the object will not be in a restored state.

Accordingly, the cloud tier proxy 206 may approximate the state of an object on the cloud as-a-whole. A first state may be that the object is accessible from the first archive store and has not yet been tiered to the second archive store. A second state may be that the object has been tiered to the second archive store and is inaccessible from the second archive storage. A third state may be that the object is stored in the second archive store and a restore of the object has been successful. A fourth state may be that the object is stored in the second archive store, a restore of the object has been issued and completed, and the object is accessible for a timeframe (e.g., a couple of days). All of this information may be approximated according to the sampling embodiments discussed herein.

Figure 3:
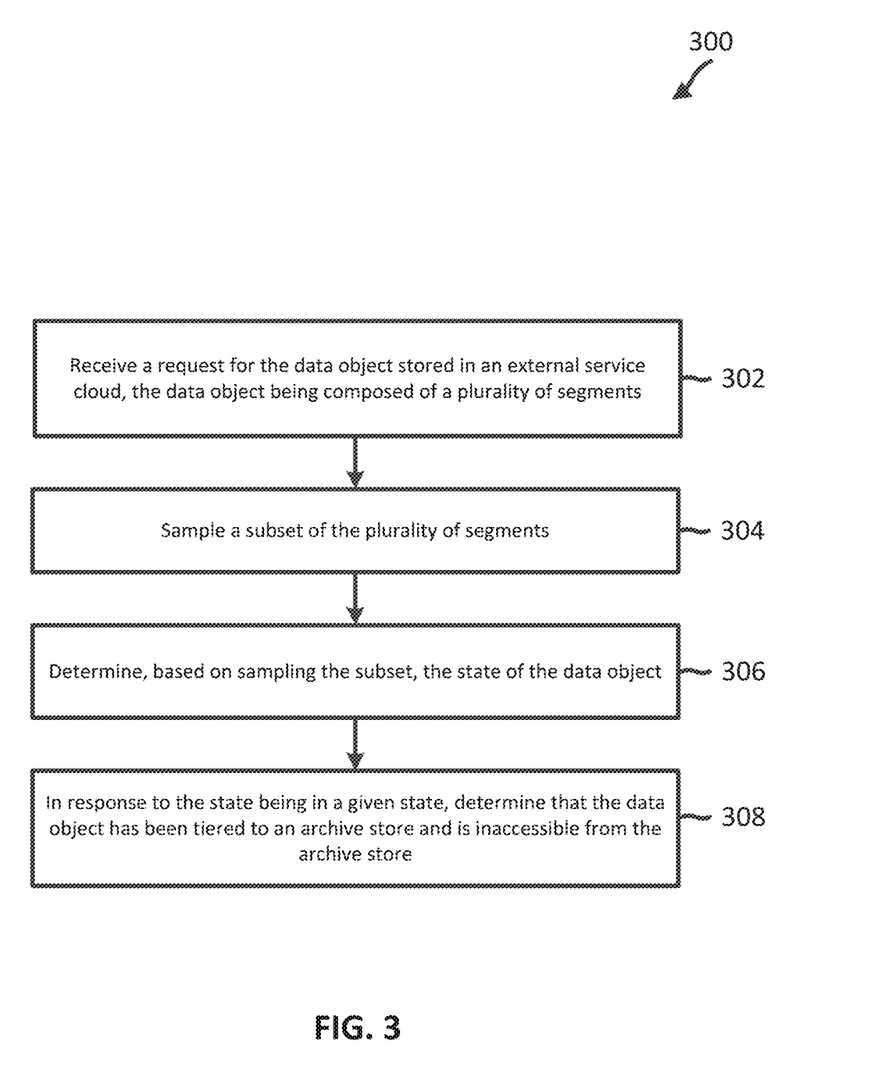
FIG. 3 is a flow diagram of a method of analyzing a state of a data object according to aspects of the present disclosure.

FIG. 3 is a flow diagram of a method 300 of analyzing a state of a data object according to aspects of the present disclosure. It is understood that additional steps can be provided before, during, and after the steps of method 300, and that some of the steps described can be replaced or eliminated for other embodiments of the method.

Referring to block 302 of FIG. 3, a storage node 106 receives a request for a data object stored in an external service cloud, the data object being composed of a plurality of segments. In a block 304, the storage node 106 samples a subset of the plurality of segments. In a block 306, the storage node 106 determines, based on sampling the subset, the state of the data object. In a block 308, in response to the state being in a given state, the storage node 106 determines that the data object has been tiered to an archive store and is inaccessible from the archive store. This is not intended to be limiting and the given state may be a different state than that described. For example, in response to the state being in a given state, the storage node 106 may determine that the data object is accessible from the first archive store and has not yet been tiered to the second archive store. In another example, in response to the state being in a given state, the storage node 106 may determine that the data object has been tiered to the second archive store and is inaccessible from the second archive storage. In another example, in response to the state being in a given state, the storage node 106 may determine that the data object is stored in the second archive store and a restore of the object has been successful. In another example, in response to the state being in a given state, the storage node 106 may determine that the data object is stored in the second archive store, a restore of the object has been issued and completed, and the object is accessible for a timeframe.

Figure 4:
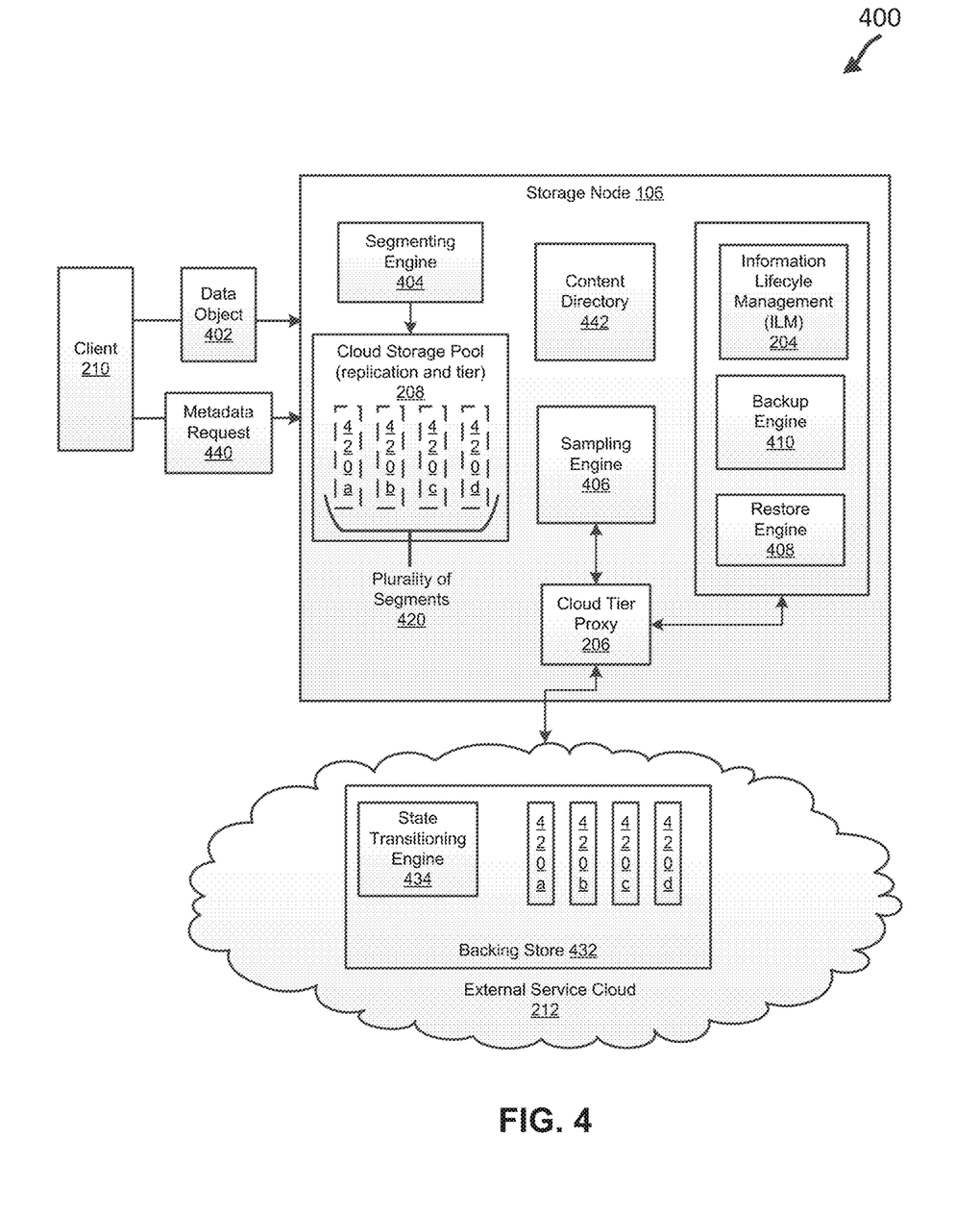
FIG. 4 is a schematic diagram of a computing architecture according to aspects of the present disclosure.

FIG. 4 is a schematic diagram of a computing architecture 400 according to aspects of the present disclosure. In FIG. 4, the client 210 may desire to store a data object 402 at the storage node 106. The storage node 106 may correspond to the grid discussed above. The client 210 sends a request to the storage node 106 to store the data object 402 and sends the data object 402 to the storage node 106. The storage node 106 includes a segmenting engine 404, a sampling engine 406, a restore engine 408, and a backup engine 410.

The segmenting engine 404 may interact with the cloud storage pool 208 to store the data object 402. In some examples, the segmenting engine 404 is incorporated within the storage controllers 112 in the storage node 106. The segmenting engine 404 receives the client's request to store the data object 402 and the data object 402. The segmenting engine 404 may store the data object 402 in one or more storage devices 110 (see FIG. 1). In an example, the segmenting engine 404 may store the data object 402 as a whole in the storage node 106. In another example, the segmenting engine 404 may partition the data object 402 into a plurality of segments 420*a*, 420*b*, 420*c*, and 420*d* for storage at the storage node 106.

The data object 402 is composed of the plurality of segments 420*a*, 420*b*, 420*c*, and 420*d*. In an example, the segmenting engine 404 determines whether a size of the data object 402 exceeds a threshold. If the size of the data object 402 exceeds the threshold, the segmenting engine 404 may partition the data object 402 into the plurality of segments 420 for storage at the storage node 106. In another example, the client 210 may upload the data object 402 as a multipart upload to the storage node 106. If the segmenting engine 404 detects that the data object 402 is part of a multipart upload request, the segmenting engine 404 may partition the data object 402 into the plurality of segments 420 for storage at the storage node 106.

The content stored at the storage node 106 may be subject to the ILM rules 204. The term "content" may be used to refer to a "data object" or a "segment of a data object." The backup engine 410 may track the lifecycle of content stored at the storage node 106 using the ILM rules 204. In an example, the backup engine 410 tiers content stored at the storage node 106 out to the cloud in accordance with the ILM rules 204. An administrator may configure the ILM rules 204 in accordance with an enterprise organization's business practices and goals. For example, the administrator may take advantage of lower costs associated with storing the data object 402 at a backing store 432 compared to at the storage node 106. Storage at the backing store 432 may be an order of magnitude cheaper than storage at the storage node 106. The backing store 432 may correspond to the first and second archive stores discussed above, as will be further discussed below.

If the backup engine 410 detects, based on the ILM rules 204, that content should be backed up to a cloud endpoint, the backup engine 410 migrates the content to the cloud endpoint. In an example, the cloud endpoint includes the backing store 432. If the data object 402 is stored as a whole (without being partitioned into the plurality of segments 420), the backup engine 410 may migrate the data object 402 from the storage node 106 to the backing store 432 and delete the data object 402 from the storage node 106. The backing store 432 may receive the data object 402 from the storage node 106 and store the data object 402 as a whole data object at the backing store 432.

If the segmenting engine 404 partitioned the data object 402 and the segments 420a, 420b, 420c, and 420d are each individually stored at the storage node 106, the backup engine 410 may migrate each of the individually stored segments 420a, 420b, 420c, and 420d to the backing store 432. The backup engine 410 may migrate these segments at different times. Accordingly, at any point in time, one or more segments (e.g., segment 420a) of the data object 402 may be stored at the storage node 106 and one or more segments (e.g., segment 420b) of the data object 402 may be stored at the backing store 432. In response to receiving an individual segment of the data object 402 from the storage node 106, the backing store 432 stores the individual segment at the backing store 432.

The backing store 432 may send a confirmation to the storage node 106 that content (e.g., individual segments) has been successfully stored at the backing store 432. After the storage node 106 receives the confirmation, the storage node 106 may delete all copies of the content from the storage node 106. In an example, if the storage node 106 deletes all copies of the content from the storage node 106, the only copies of the content may be found at the backing store 432.

For simplicity, segments of the same data object 402 may be described as being stored at the same backing store (e.g., backing store 432), but it should be understood that segments of the same data object 402 may be stored across multiple backing stores. For example, segment 420a may be stored at the backing store 432, and segment 420b may be stored at another backing store different from the backing store 432.

The backing store 432 may have a plurality of storage classes for the storage of content. The backing store 432 may correspond to the first and second archive stores discussed above. The first archive store may correspond to a first storage class, and the second archive store may correspond to a second storage class. The backing store 432 includes a state transitioning engine 434 that transitions segments stored at the backing store 432 between the first and second archive stores, which represent different storage classes or tier levels within the backing store 432. If a segment is of the first storage class (e.g., stored in the first archive store), the segment may be considered to have not been archived or not tiered in the backing store. The first archive store may be a default store in which the segment is saved. After a condition is satisfied (e.g., time elapses), the state transitioning engine 434 may archive or tier the segment in the backing store 432. If a segment is of the second storage class (e.g., stored in the second archive store), the segment may be considered to have been archived or tiered in the backing store.

A storage class associated with a segment may be represented by a segment state of the segment. A "segment state" may also be referred to as a "state." A segment stored at the backing store 432 may be in one of a plurality of segment states. The state transitioning engine 434 transitions segments stored at the backing store 432 into different segment states. Segments of the data object 402, depending on the behavior of the cloud endpoint (e.g., backing store 432), can be in different states. The state transitioning engine 434 may set the segment state of a segment to one segment state of a plurality of segment states. [45] Different segments may be in different segment states for various reasons. In an example, segments are in different segment states because the backing store 432 tiers various segments of the data object 402 at different times, depending on the segments' lifecycles. In another example, a restore operation for segments 420a and 420b may be triggered. The restore of the segment 420a may succeed while the restore of the segment 420b fails, causing the segments 420a and 420b to be in different states.

Figure 5:
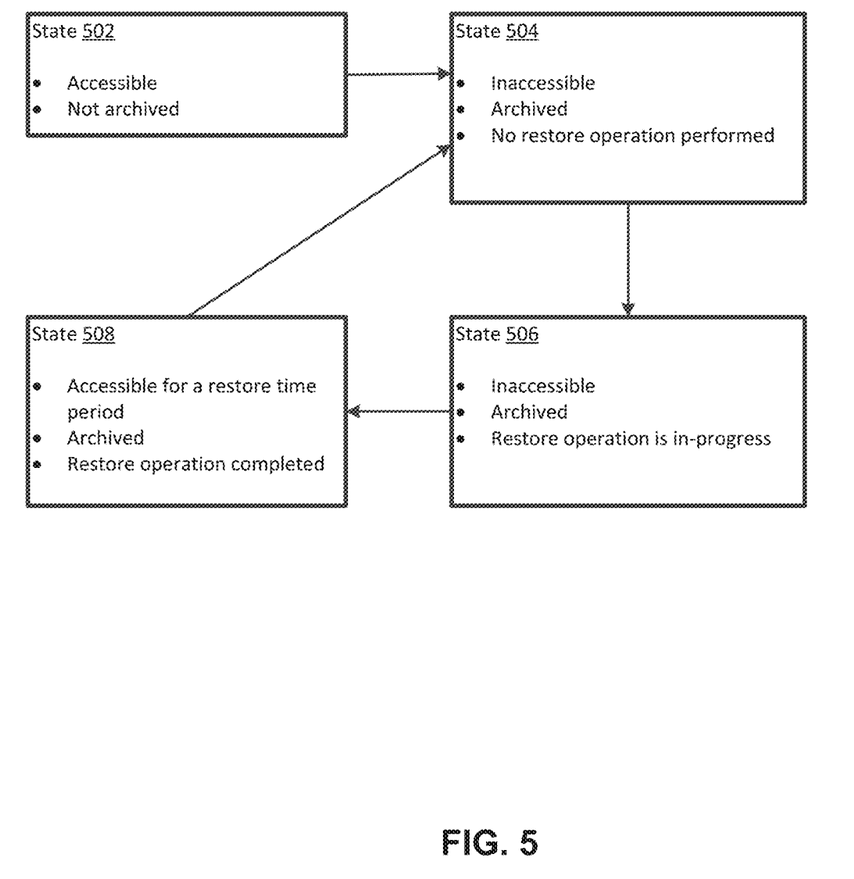
FIG. 5 illustrates example segment states associated with a backing store according to aspects of the present disclosure.

FIG. 5 illustrates example segment states associated with the backing store 432 according to aspects of the present disclosure. In the example illustrated in FIG. 5, a segment may be in one of four segment states 502, 504, 506, or 508. A segment that is in the segment state 502 is accessible through the backing store 432 but has not been archived into another storage class yet. In an example, a segment that is in the segment state 502 may be read directly without a restore operation. The state transitioning engine 434 may transition a segment that is in the state 502 to the state 504 if one or more conditions are satisfied (e.g., time elapses). In an example, the state 502 may be the default state of a segment that is stored at the backing store 432. A segment that is in the segment state 504 is inaccessible through the backing store 432. In an example, a segment that is in the segment state 504 has been archived in the backing store 432 and no restore operation has been performed for the segment.

A segment that is in the segment state 506 is inaccessible through the backing store 432. In an example, a segment that is in the segment state 506 has been archived in the backing store 432 and a restore of the segment is in-progress. A restore of a segment that is in-progress indicates that a restore operation for the segment has been requested, but the restore operation has not yet completed. Accordingly, the restore operation has been triggered, but the segment has not been restored yet. A segment that is in the segment state 508 is accessible through the backing store 432. In an example, a segment that is in the segment state 508 has been archived in the backing store 432 and a restore operation of the segment has completed. A segment that has been restored is accessible for a restore time period (e.g., seven days). After the restore time period for a segment has elapsed, the state transitioning engine 434 may set the segment to the state 504.

Different segment states may be associated with different costs. In an example, the more restrictive a segment state of a segment is, the cheaper it may be to store the segment. As an example, the most restrictive state of the states 502, 504, 506, and 508 may be the state 504 because more processing cycles may be used for returning a segment that is set to the state 504 to a requestor compared to a segment that is set to the state 502, 506, or 508. A segment that is set to the state 504 is inaccessible and no restore operation for the segment has been performed. To retrieve that segment, a restore operation for the segment is triggered and completed. In an example, the state information may specify that the data object is inaccessible and that no restore operation for the data object has been performed.

As another example, the most restrictive state of the remaining states 502, 506, and 508 may be the state 506 because more processing cycles may be used for returning a segment that is set to the state 506 to a requestor compared to a segment that is set to the state 502 or 508. A segment that is set to the state 506 is inaccessible and a restore operation for the segment has been triggered but not yet completed. A segment in the state 506 is retrievable after the restore operation is completed. In an example, the state information may specify that the data object is inaccessible and a restore operation for the data object has been triggered but not yet completed.

As another example, the most restrictive state of the remaining states 502 and 508 may be the state 508 because the segment may be accessible for a shorter time period (e.g., the restore time period) than a segment that is set to the state 502. A segment that is set to the state 508 is accessible for a restore time period. In an example, the state information may specify that the data object is accessible and for how long the data object is accessible. After the restore time period has elapsed for a restored segment, the state transitioning engine 434 may set the state of the segment to the state 504. As an example, the least restrictive state of the states 502, 504, 506, and 508 may be the state 502 because the segment may be accessible for the longest time period and without consuming more processing cycles, compared to a segment in the state 502, 504, 506, or 508. In an example, the state information may specify that the data object is accessible.

An enterprise that uses the backing store 432 to back up content stored at the storage node 106 may configure the different segment states and configure the state transitioning engine 434 to transition one or more segments from one state to another state. In an example, the enterprise may configure the state transitioning engine 434 to transition segments that have been stored at the backing store 432 over a threshold time period (e.g., six months) from the state 502 to the state 504. The enterprise may determine that based on its business practices, content stored at the backing store 432 is generally requested in high volume within six months from storage at the backing store 432, and very infrequently after that time period. In another example, the enterprise may establish a default restore period that may be overwritten by users with special privileges (e.g., an administrator).

In the example illustrated in FIG. 5, four segment states are shown, but it should be understood that other examples including fewer than or more than four segment states are within the scope of the disclosure. For example, the backing store 432 may have two segment states. In an example, a first segment state may indicate that a segment is accessible, and a second segment state may indicate that a segment is inaccessible. Additionally, different segment states than that discussed in the disclosure may be used and are within the scope of the disclosure.

Referring back to FIG. 4, after the storage node 106 has stored the data object 402, the client 210 may send a metadata request 440 for the data object 402 to the storage node 106. In an example, the metadata request 440 is a request for metadata of the data object 402 without a request for the return of the actual data object 402 itself. The storage node 106 may receive the metadata request 440 and retrieve the metadata of the data object 402 without returning the data object 402 itself. In an example, the sampling engine 406 receives the metadata request 440 for the data object 402 and determines whether the client 210 has permission to read the data object 402. If the client 210 has permission to read the data object 402, the sampling engine 406 may perform actions to retrieve the metadata and transmit it to the client 210. If the client 210 does not have permission to read the data object 402, the sampling engine 406 may send the client 210 an error message.

In some examples, the sampling engine 406 samples one or more segments of which the data object 402 is composed to obtain the states of the sampled segments. The sampling engine 406 may have access to a content directory 442 that stores information about the data objects and their associated segments that have been backed up. The content directory 440 may store location information and the names for each segment that has been migrated to a backing store. For example, the content directory 440 may specify that segment 420a is located at backing store 432. In response to the metadata request 440, the sampling engine 406 may perform a lookup of the data object 402 in the content directory 442 and find the plurality of segments 420 of which the data object 402 is composed. The plurality of segments 420 may be stored at one or more cloud endpoints (e.g., the backing store 432).

The sampling engine 406 selects a subset of the plurality of segments 420 for sampling using various techniques. The subset may be a percentage of the segments included in the plurality of segments 420 (e.g., twenty percent). For example, if the segmenting engine 404 partitions the data object 402 into one thousand segments and the sampling engine 406 is configured to sample ten percent of the total number of segments of which the data object 402 is composed, the sampling engine 406 may select one hundred segments to sample for their segment states. The subset of segments may be randomly selected in the sense that they are arbitrarily selected and one segment being selected is independent from another segment being selected. In an example, the sampling engine 406 executes a random number generator (e.g., initializing a random seed), associates each segment with a number, and for selects, based on the random number generator and number associated with a segment, the subset of segments for sampling. In another example, the sampling engine 406 may be configured to sample a default number of segments (e.g., ten segments).

Other techniques for selecting the subset of segments are within the scope of the disclosure. For example, the sampling engine 406 may sample all segments of which the data object 402 is composed, sample every ten segments of the plurality of segments of which the data object 402 is composed, or sample the first and last segments of which the data object 402 is composed.

The sampling engine 406 selects the subset of segments and sends a state request to each backing store at which a segment of the selected subset is stored. The state request for a segment is a request for the state of the segment. The appropriate backing store receives the state request for a segment and returns the segment's state request to the sampling engine 406. The sampling engine 406 may receive a plurality of segment states from one or more backing stores storing the subset of segments. The sampling engine 406 may keep track of the segment states by storing the plurality of segment states in the content directory 440. The sampling engine 406 determines a most restrictive state of the plurality of segment states and sends state information indicating aspects of the most restrictive state to the client 210 in response to the metadata request 440. For example, the state information may include information such as for how long a temporary copy of a segment will be accessible. The sampling engine 406 sends the state information derived from the most restrictive state as the state of the data object 402.

If a segment 420a is in the state 508 having a first restore time period and a segment 420b is in the state 508 having a second restore time period, the more restrictive state of the two may be the one having the shorter restore time period. In this example, the sampling engine 406 may transmit state information derived from the state 508 having the shorter restore time period to the client 210, so that the client 210 knows for how long the data object 402 is accessible. Although the sampling engine 406 samples a subset of the plurality of segments 420 for their segment states rather than all segments of which the data object 402 is composed, the segment states of the subset may be a close approximation of the state of the entire data object 402. Additionally, when the client 210 sends a restore request for the data object 402 to the storage node 106, the restore request typically triggers the restore of all segments of the data object 402 that are inaccessible. The restore of the segments may be triggered and thereafter completed around the same time such that if the state of the segment 420*a* is accessible, it is likely that segments 420*b*, 420*c*, and 420*d* are also accessible, whether these three are sampled or not. Accordingly, it may be unnecessary for the sampling engine 406 to request the segment states for all segments of which the data object 402 is composed.

The client 210 receives the state information derived from the most restrictive state of the plurality of segment states from the sampling engine 406 and determines, based on the state information, whether to request a restore operation for the data object 402 or request the data object 402. In an example, if the state information indicates that the state 502 or the state 508 is the most restrictive state of a segment of the data object 402, the client 210 may determine that the data object 402 is accessible. The client 210 may be unaware that the storage node 106 has backed up segments of the data object 402 at a backing store 432. In response to receiving the state information specifying the state of the data object 402, the client 210 may send a request for the data object 402 to the storage node 106, which may then request the data object 402 from the backing store 432. The storage node 106 receives the data object 402 from the backing store 432 and sends the data object 402 to the client 210.

In another example, if the sampling engine 406 transmits state information derived from the state 506 as being the most restrictive state of the data object 402, the client 210 may determine that the data object 402 is inaccessible. Based on receiving state information indicating that the state 506 is the state of the data object 402, the client 210 may determine that a restore operation for the data object 402 is in-progress but has not yet been completed. The client 210 may wait for a time period and after the time period elapses, the client 210 may send another metadata request for the data object 402.

In another example, if the sampling engine 406 transmits state information derived from the state 504 as being the most restrictive state of the data object 402, the client 210 may determine that the data object 402 is inaccessible. Based on receiving state information indicating that the state 504 is the state of the data object 402, the client 210 may determine that a restore operation for the data object 402 has not been performed. If segment 420*a* is accessible and segment 420*b* is inaccessible through the backing store 432, the client 210 may be unaware of such differences between the individual segments because the client 210 may determine that the most restrictive state indicated in the state information is the state of the entire data object 402. Accordingly, the client 210 may send a request to perform the restore operation for the entire data object 402 to the storage node 106. The storage node 106 receives the restore request, and the restore engine 408 processes the restore request. The restore engine 408 may translate the single restore request for the data object 402 into a plurality of restore requests for segments of the data object 402 that are inaccessible. In an example, each restore request of the plurality of restore requests is a request to restore an inaccessible segment of which the data object 402 is composed. The restore engine 408 may search for the states of each segment of the plurality of segments 420 by performing a lookup in the content directory 440. In an example, the sampling engine 406 stores the state of the sampled segments into the content directory 440. Accordingly, the restore engine 408 may request that a restore operation be performed for individual segments that are inaccessible based on the returned segment states of the subset of segments selected by the sampling engine 406. In another example, the restore engine 408 restores each segment of the plurality of segments 420, without checking whether the respective segment is already accessible.

The segmenting engine 404 may send the restore requests to the backing store 432. The backing store 432 receives the restore requests for the individual segments and restores the appropriate segments. The backing store 432 may restore the segment by creating a temporary copy of the segment and providing accessibility to the copy for a restore time period. In an example, the restore period may be configured by the administrator of the storage node 106. In another example, the client 210 specifies the restore period in the request for the restore operation. A segment that has been restored and is accessible is available through the external service cloud 212. Although the segmenting engine 404 has been described as sending the restore requests to the same backing store 432, it should be understood that the segmenting engine 404 may send restore requests to different backing stores if segments of the data object 402 are stored in different backing stores.

In some examples, after sending the restore request to the storage node 106, the client 210 may wait for a time period. After the time period elapses, the client 210 may send another metadata request to the storage node 106. If the storage node 106 sends a message indicating that the data object 402 is accessible in response to the metadata request, the client 210 may send a request for the data object 402 to the storage node 106. In some examples, the backing store 432 may send the restore engine 408 confirmation of each segment that has been successfully restored. If the restore engine 408 receives confirmation that each segment of the data object 402 has been restored, the restore engine 408 may send a message to the client 210, the message indicating that the data object 402 has been successfully restored. In response to receiving the message, the client 210 may send a request for the data object 402 to the storage node 106.

If the client 210 sends a request for the data object 402 and not all segments of the plurality of segments 420 are accessible, the storage node 106 may send a message indicating that the data object 402 is not accessible to the client. In response to the message, the client 210 may send a request to restore the data object 402.

In an example, segment 420*a* of the data object 402 may be stored at the storage node 106, and one or more other segments of the data object 402 may be stored at the backing store 432. In this example, the segment 420*a* has not been backed up and remains accessible through the storage node 106. It may be unnecessary for the sampling engine 406 to sample the state of the segment 420*a* because the sampling engine 406 is already aware that the segment 420*a* is accessible through the storage node 106. If a segment remains accessible through the storage node 106, this may be considered a fifth state having the same restrictiveness level as the state 502 in FIG. 5.

Figure 6:
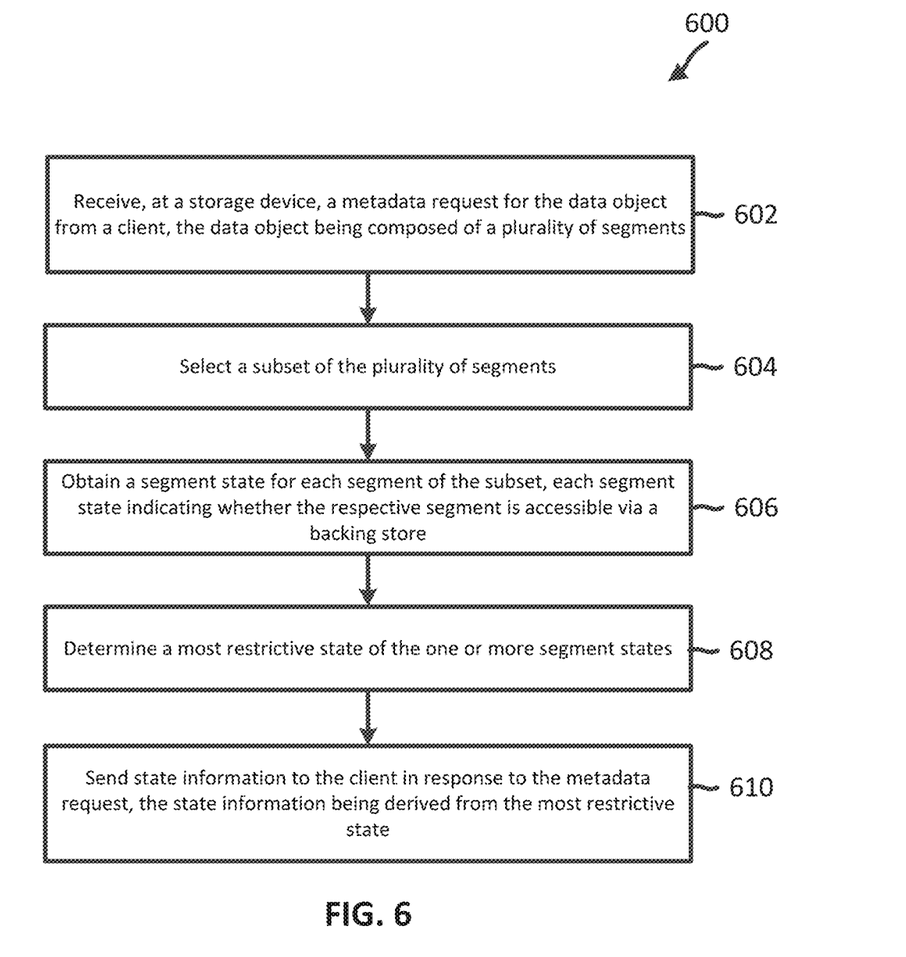
FIG. 6 is a flow diagram of a method of analyzing a state of a data object according to aspects of the present disclosure.

FIG. 6 is a flow diagram of a method of analyzing a state of a data object according to aspects of the present disclosure. Steps of the method 600 can be executed by a computing device (e.g., a processor, processing circuit, and/or other suitable component). For example, a storage node such as the storage node 106, may utilize one or more components, such as the segmenting engine 404, the sampling engine 406, backup engine 410, and/or restore engine 408, to execute the steps of method 600. As illustrated, the method 600 includes a number of enumerated steps, but embodiments of the method 600 may include additional steps before, after, and in between the enumerated steps. In some embodiments, one or more of the enumerated steps may be omitted or performed in a different order.

At step 602, the method 600 includes receiving, at a storage device, a metadata request for the data object from a client, the data object being composed of a plurality of segments. In an example, the storage node 106 partitions the data object 402 and stores the data object as individual segments. The metadata request may be a request for a state of the data object 402, the state indicating whether the data object 402 is accessible or inaccessible. Rather than request the entire data object 402 as-a-whole, the client 210 may send the metadata request to save time and costs, in the case where the data object 402 is inaccessible. For example, if the client 210 sends a request for the entire data object 402, retrieval of the data object 402 includes retrieving the individual segments of the data object 402.

At step 604, the method 600 includes selecting a subset of the plurality of segments. The sampling engine 406 may select the subset using a variety of techniques. For example, the sampling engine 406 may randomly select the subset such that the selection of one segment is independent from the selection of another segment.

At step 606, the method 600 includes obtaining a segment state for each segment of the subset, each segment state indicating whether the respective segment is accessible via a backing store. In an example, a segment stored in the backing store may be in the segment state 502, 504, 506, or 508. Although the sampling engine 406 samples a subset of the plurality of segments 420 for their segment states rather than all segments of which the data object 402 is composed, the segment states of the subset may be a close approximation of the state of the entire data object 402.

At step 608, the method 600 includes determining a most restrictive state of the one or more segment states. As an example, a first state may be more restrictive than a second state if more processing cycles are used for returning a segment that is in the first state compared to the second state. At step 610, the method 600 includes sending state information to the client in response to the metadata request, the state information being derived from the most restrictive state. The client may receive the state information and return a response based on the most restrictive state indicated in the state information.

Fan-In

The cloud tier proxy 206 may consolidate data from multiple distributed storage system instances running in the field into a single-centralized distributed storage system instance. For example, multiple distributed storage system instances may run in small data centers in a client 210's deployment, and the client 210 may tier objects to a single-centralized distributed storage system instance running in a large data center, which may be referred to as the fanned-in grid.

Each individual small data center may set up its own ILM rules and policies. A rule or policy may include compression, encryption, and tiering rules or policies. For example, the tiering policy may specify that an object is to be tiered to a common location at which a larger grid is managed, when one or more conditions have been satisfied. The larger grid may refer to the fanned-in grid. Data sovereignty may be maintained in the sense that even though the data is fanned into the single-centralized distributed storage system instance from multiple distributed storage system instances, the data is still separated. For example, the data from a given smaller distributed storage system instance may have been compressed and/or encrypted. When fanned-in to the fanned-in grid, that compressed, encrypted data will remain such in the fanned-in grid, such that its integrity is maintained.

A small distributed storage system instance of the multiple distributed storage system instances may have connectivity to the fanned-in grid and may replicate content in the grid. Accordingly, if the small distributed storage system instance loses connectivity with the fanned-in grid, the client 210 may still be able to retrieve and manage its content. When the small distributed storage system instance establishes connectivity to the fanned-in grid, the small instance may modify or delete data and work in a federated manner so that individual smaller sites can operate separately, but also use the centralized grid to store data that they access frequently or desire to store with much higher efficiency. In an example, the client 210 may have many different small grids tiering data to the first and/or second archive stores and may manage its own data.

Binary Format of Tiered Data:

Object data in the storage pool 208 may be packetized and stored on disk with packet checksums and metadata. During packetization, the data is compressed (if enabled) and then encrypted (if enabled), and the packetized data is tiered to the external service cloud 212. The compression and encryption of packetized data is carried forward if it is transitioned from the grid to the external cloud service 212, and the packetized data retains compression and encryption. In an example, if an object that is 1 gigabyte (GB) is compressed and stored as a 100 megabyte (MB) representation of the object, then the compressed object that is 100 MB may be moved to the external service cloud 212. Additionally, encryption is typically performed when the object was ingested in the grid and not by the cloud service provider or on-the-fly when being transmitted. Such compression and encryption may be advantageous if the object is being stored in a multi-tenant deployment to safeguard the data. Additionally, the packetized data may also contain object metadata that can be used to identify the object by a recovery application.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system, method, and machine-readable storage medium for analyzing a state of a data object in a distributed storage system. In some embodiments, the method includes receiving a request for the data object stored in an external service cloud. The data object is composed of a plurality of segments. The method also includes sampling a subset of the plurality of segments and determining, based on sampling the subset, the state of the data object. The method further includes in response to the state being in a first state, determining that the data object has been tiered to an archive store and is inaccessible from the archive store.

In yet further embodiments, the non-transitory machine-readable medium has instructions for performing the method of analyzing a state of a data object, including machine executable code, which when executed by at least one machine, causes the machine to: receive a request for the data object stored in an external service cloud, the data object being composed of a plurality of segments; sample a subset of the plurality of segments; determine, based on sampling the subset, the state of the data object; and in response to the state being in a first state, determine that the data object has been tiered to an archive store and is inaccessible from the archive store.

In yet further embodiments, the computing device includes a memory containing a machine-readable medium comprising machine executable code having stored thereon instructions for performing a method of analyzing a state of a data object and a processor coupled to the memory. The processor is configured to execute the machine executable code to: receive a request for the data object stored in an external service cloud, the data object being composed of a plurality of segments; sample a subset of the plurality of segments; determine, based on sampling the subset, the state of the data object; and in response to the state being in a first state, determine that the data object has been tiered to an archive store and is inaccessible from the archive store.

In some embodiments, the method includes receiving, at a storage device, a metadata request for the data object from a client, the data object being composed of a plurality of segments; selecting a subset of the plurality of segments; obtaining a segment state for each segment of the subset, each segment state indicating whether the respective segment is accessible via a backing store; determining a most restrictive state of the one or more segment states; and sending state information to the client in response to the metadata request, the state information being derived from the most restrictive state.

In yet further embodiments, the non-transitory machine-readable medium has instructions for performing the method of analyzing a state of a data object, including machine executable code, which when executed by at least one machine, causes the machine to: receive, at a storage device, a metadata request for a data object from a client, the data object being composed of a plurality of segments; select a subset of the plurality of segments; obtain a segment state for each segment of the subset, each segment state indicating a storage class of the respective segment, a first storage class indicating that the respective segment is accessible, and a second storage class indicating that the respective segment is inaccessible; and send a first message indicating that the data object is inaccessible via a backing store based on at least one segment of the subset being of the second storage class.

In yet further embodiments, the computing device includes a memory containing a machine-readable medium comprising machine executable code having stored thereon instructions for performing a method of analyzing a state of a data object and a processor coupled to the memory. The processor is configured to execute the machine executable code to: store, at a storage node, a data object, the data object being composed of a plurality of segments; migrate, at the storage device, the plurality of segments to one or more backing stores; receive, at the storage device, a metadata request for the data object from a client; obtain a segment state for a subset of the plurality of segments, each segment state of the subset indicating whether the respective segment is accessible via the one or more backing stores; and send state information derived from a most restrictive state of the one or more segment states to the client in response to the metadata request.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   selecting a subset of a plurality of segments of a requested data object that is at least partially stored on a cloud service external to a storage node;
   receiving a plurality of segment states corresponding to segments of the subset, each segment state indicating a storage class of a respective segment, a first storage class being accessible, and a second storage class being inaccessible, wherein the first storage class corresponds to a first tier level and wherein the second storage class corresponds to a second tier level, and wherein receiving the plurality of segment states comprises:
      obtaining a segment state for each segment of the subset, wherein storage of the respective segment at the first tier level indicates that the respective segment is accessible via the cloud service, and accessibility of the respective segment stored at the second tier level is dependent, at least in part, on performance of a restore operation on the respective segment;
   determining a state of the data object based on the plurality of segment states; and
   sending a first message indicating that the data object is inaccessible based on at least one segment of the subset being of the second storage class.

2. The method of claim 1, wherein the second storage class requires more processing cycles to return the respective segment than does the first storage class.

3. The method of claim 1, wherein determining the state of the data object comprises:
   determining that a first segment is accessible via the cloud service in response to a determination that the first segment has not been tiered in the cloud service.

4. The method of claim 1, wherein determining the state of the data object comprises:
   determining that a first segment is inaccessible via the cloud service in response to a determination that the first segment has been tiered in the cloud service and a restore operation for the first segment has not been triggered.

5. The method of claim 1, wherein determining the state of the data object comprises:
   determining that a first segment is inaccessible via the cloud service in response to a determination that the first segment has been tiered in the cloud service and a restore operation for the first segment is in-progress.

6. The method of claim 1, wherein determining the state of the data object comprises:
    determining that a first segment is accessible via the cloud service for a restore time period in response to the first segment having been tiered in the cloud service and a restore operation for the first segment associated with the restore time period has completed.

7. The method of claim 1, further comprising:
    receiving a first request to restore the data object; and
    issuing a second request to the cloud service to restore the data object.

8. A method comprising:
    sampling a subset of a plurality of segments of a requested data object that is at least partially stored on a cloud service external to a storage node;
    receiving a plurality of segment states corresponding to segments of the subset, each segment state indicating a storage class of a respective segment, a first storage class being accessible, and a second storage class being inaccessible, wherein the first storage class corresponds to a first tier level and wherein the second storage class corresponds to a second tier level, and wherein receiving the plurality of segment states comprises:
        obtaining a segment state for each segment of the subset, wherein storage of the respective segment at the first tier level indicates that the respective segment is accessible via the cloud service, and accessibility of the respective segment stored at the second tier level is dependent, at least in part, on performance of a restore operation on the respective segment;
    approximating a state of the data object based on the plurality of segment states; and
    transmitting state information to the client, the state information indicating the state of the data object and being derived from a most restrictive state.

9. The method of claim 8, further comprising:
    receiving a request for the data object based on the most restrictive state being that each segment of the subset is accessible via the cloud service and that each segment of the subset has not been tiered in the cloud service.

10. The method of claim 8, further comprising:
    receiving a request to restore the data object based on the most restrictive state being that a first segment of the subset is inaccessible via the cloud service, the first segment has been tiered in the cloud service, and a restore operation for the first segment has not been triggered.

11. The method of claim 8, further comprising:
    receiving a request for the data object based on the most restrictive state being that a first segment of the subset is inaccessible via the cloud service, the first segment has been tiered in the cloud service, and a restore operation for the first segment is in-progress.

12. The method of claim 8, further comprising:
    receiving a request for the data object based on the most restrictive state being that each segment of the subset is accessible via the cloud service for a restore time period and that each segment of the subset has been tiered in the cloud service.

13. The method of claim 8, further comprising:
    issuing, at the storage node, a request to restore the data object stored in the cloud service.

14. A non-transitory machine-readable medium having stored thereon instructions for performing a method of data recovery, comprising machine executable code which when executed by a machine, causes the machine to:
    sample a plurality of segments of a data object that is at least partially stored on a cloud service external to a storage node;
    generate a plurality of segment states corresponding to a subset of the plurality of segments according to the sampling, each segment state indicating a storage class of a respective segment, a first storage class being accessible, and a second storage class being inaccessible, wherein the first storage class corresponds to a first tier level and wherein the second storage class corresponds to a second tier level, and wherein generating the plurality of segment states comprises: obtaining a segment state for each segment of the subset, wherein storage of the respective segment at the first tier level indicates that the respective segment is accessible via the cloud service, and accessibility of the respective segment stored at the second tier level is dependent, at least in part, on performance of a restore operation on the respective segment;
    determine a state of the data object based on the plurality of segment states; and
    send a first message indicating that the data object is inaccessible based on at least one segment of the subset being of the second storage class.

15. The non-transitory machine-readable medium of claim 14, wherein determining the state of the data object causes the machine to:
    determine that a first segment is accessible via the cloud service in response to a determination that the first segment has not been tiered in the cloud service.

16. The non-transitory machine-readable medium of claim 14, wherein determining the state of the data object causes the machine to:
    determine that a first segment is inaccessible via the cloud service in response to a determination that the first segment has been tiered in the cloud service and a restore operation for the first segment has not been triggered.

17. The non-transitory machine-readable medium of claim 14, wherein determining the state of the data object causes the machine to:
    determine that a first segment is inaccessible via the cloud service in response to a determination that the first segment has been tiered in the cloud service and a restore operation for the first segment is in-progress.

18. The non-transitory machine-readable medium of claim 14, wherein determining the state of the data object causes the machine to:
    determine that a first segment is accessible via the cloud service for a restore time period in response to the first segment having been tiered in the cloud service and a restore operation for the first segment associated with the restore time period has completed.

19. The non-transitory machine-readable medium of claim 14, wherein the machine executable code further causes the machine to:
    receive a first request to restore the data object; and
    issue a second request to the cloud service to restore the data object.

20. The non-transitory machine-readable medium of claim 14, wherein the second storage class requires more processing cycles to return a respective segment than does the first storage class.

* * * * *